L. W. HOLMES.
ANTISKID DEVICE FOR AUTOTRUCK WHEELS.
APPLICATION FILED MAY 5, 1919.
1,329,765.
Patented Feb. 3, 1920.
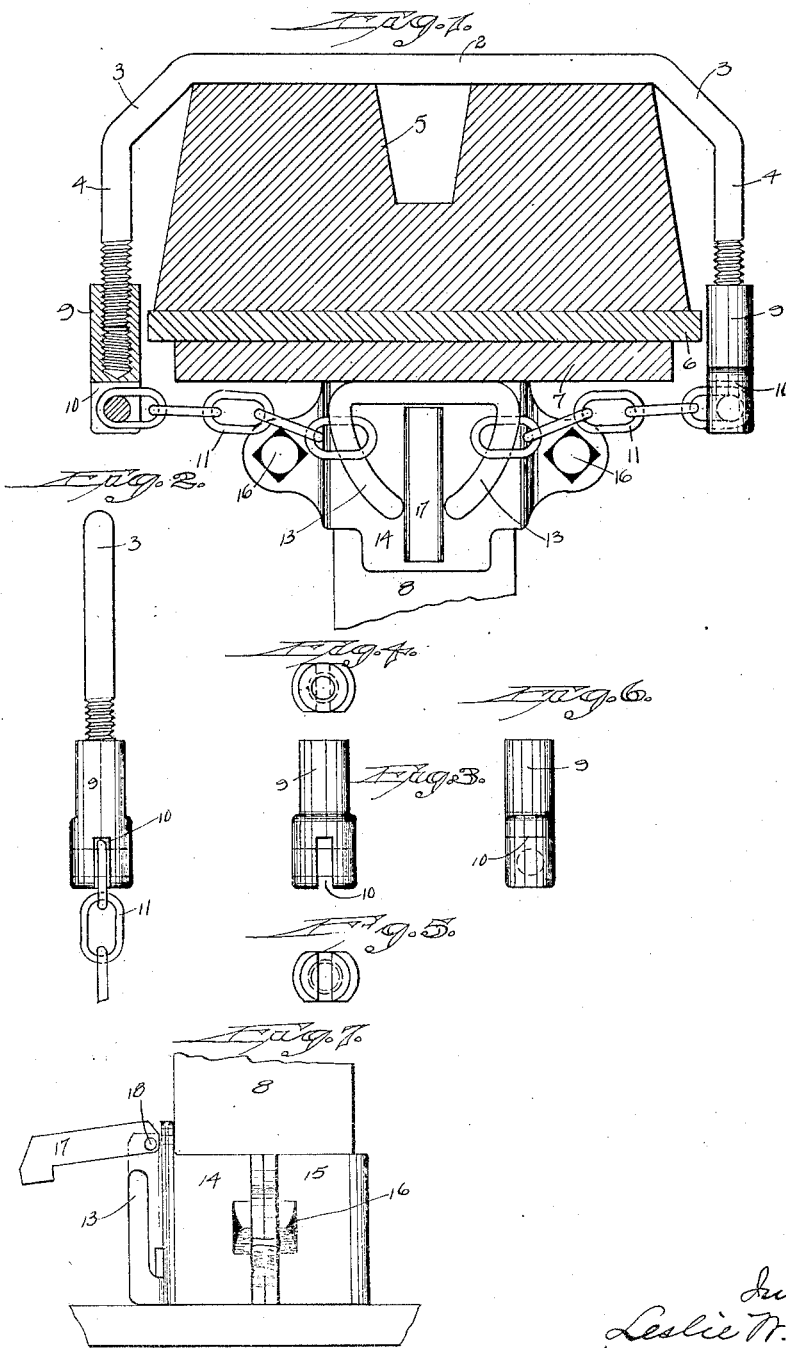

UNITED STATES PATENT OFFICE.

LESLIE WILLIAM HOLMES, OF SHELTON, CONNECTICUT, ASSIGNOR TO HOLMES MANUFACTURING CO., OF SHELTON, CONNECTICUT, A CORPORATION.

ANTISKID DEVICE FOR AUTOTRUCK-WHEELS.

1,329,765.  Specification of Letters Patent.  Patented Feb. 3, 1920.

Application filed May 5, 1919. Serial No. 294,884.

*To all whom it may concern:*

Be it known that I, LESLIE W. HOLMES, a citizen of the United States, residing at Shelton, in the county of Fairfield and State of Connecticut, have invented a new and useful Improvement in Antiskid Devices for Autotruck-Wheels; and I do hereby declare the following, when taken in connection with the accompanying drawings and the characters of reference marked thereon, to be a full, clear, and exact description of the same, and which said drawings constitute part of this application, and represent, in—

Figure 1 a broken view partly in elevation and partly in transverse section showing my improved anti-skid device as applied to the rim of an auto-truck wheel having a dual tire.

Fig. 2 a detached view in side elevation of one of the grippers and one of the coupling-sockets thereof.

Fig. 3 a detached view of the coupling-socket in side elevation.

Fig. 4 a detached, end view thereof.

Fig. 5 a reverse end view thereof.

Fig. 6 a side view thereof.

Fig. 7 a broken view in side elevation of the anchor with which the free ends of the chains of the respective coupling sockets are connected.

This invention relates to an improvement in anti-skid devices for auto-truck wheels, the object being to provide at a low cost for manufacture, a simple, durable and reliable device constructed with particular reference to its use in conjunction with spoke-anchors of standard type.

With these ends in view, my invention consists in an anti-skid device for auto-truck wheels, comprising a one-piece U-shaped gripper having threaded stems at its respective ends, and adjustable coupling-sockets having their outer ends threaded for the reception of the said stems and their inner ends provided with anchoring chains.

My invention further consists in certain details of construction as will be hereinafter described and pointed out in the claims.

In carrying out my invention I employ a plurality of one-piece U-shaped grippers each comprising, as shown, a round rod of suitable metal bent to form a tread 2, complementary corner inclines 3 and threaded stems 4 which latter are parallel with each other and stand at a right angle to the tread 2, which, as shown, is wide enough to extend transversely across a dual rubber tire 5 encircling a rim 6 on a felly 7 carried by the usual spokes 8. The threaded stems 4 aforesaid, enter threaded holes in the outer ends of adjustable complementary coupling-sockets 9 the inner ends of which are slightly enlarged and formed with slots 10 for the reception of the outer links of short anchoring chains 11, the said outer links being secured in the said sockets by heavy pins passing through the slotted ends thereof. These chains are adapted in length to have the links at their free ends caught over curved hooks 13 extending inward with respect to the tire and toward each other and formed upon the member 14 of a two-part clamp 14, 15, applied to the outer end of the spoke 8 and held thereupon by bolts 16. The said links of the chains are prevented from escaping from the said hooks by means of a latch 17 swung upon a pivot 18 in the member 14 of the clamp and adapted in width to swing down between the adjacent ends of the hooks 13 as shown in Fig. 1. The sockets 9 are adjustably connected with the stems 4 of the grippers as above stated, while the chains are adapted in length to permit the grippers to have the play required. Although I have shown but one gripper and its two sockets, it will be understood that each wheel is provided with a plurality of these devices, the number being dependent upon the conditions of use.

I claim:—

1. In an anti-skid device for auto-truck wheels, the combination with a one-piece U-shaped gripper comprising a tread having threaded stems at its respective ends, of adjustable coupling-sockets having their outer ends threaded for the reception of the said stems and their inner ends provided with chains for attachment to anchoring means applied to the wheel.

2. In an anti-skid device for auto-truck wheels, the combination with a one-piece U-shaped gripper comprising a tread having threaded stems at its respective ends, of adjustable coupling-sockets having their outer ends threaded for the reception of the said stems and their inner ends slotted for the reception of the outer links of short chains held in place by pins passing through the slotted portions of the sockets and through the said links of the chains.

In testimony whereof, I have signed this specification in the presence of two subscribing witnesses.

LESLIE WILLIAM HOLMES.

Witnesses:
ELEANOR JOHNS,
HARRY B. GORHAM.